(12) United States Patent
Close et al.

(10) Patent No.: US 11,573,074 B2
(45) Date of Patent: Feb. 7, 2023

(54) HYBRID POSITION SENSOR

(71) Applicant: Melexis Technologies SA, Bevaix (CH)

(72) Inventors: Gael Close, Bevaix (CH); Lorenzo Lugani, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 38 days.

(21) Appl. No.: 17/189,789

(22) Filed: Mar. 2, 2021

(65) Prior Publication Data
US 2021/0278195 A1 Sep. 9, 2021

(30) Foreign Application Priority Data
Mar. 4, 2020 (EP) ..................................... 20160963

(51) Int. Cl.
| | | |
|---|---|---|
| *G01B 7/30* | (2006.01) | |
| *G01B 7/00* | (2006.01) | |
| *G01D 5/14* | (2006.01) | |
| *G01D 5/16* | (2006.01) | |

(52) U.S. Cl.
CPC .............. *G01B 7/30* (2013.01); *G01B 7/003* (2013.01); *G01D 5/145* (2013.01); *G01D 5/16* (2013.01)

(58) Field of Classification Search
CPC ........ G01R 33/09; G01R 33/0094; G01P 3/00
See application file for complete search history.

(56) References Cited

U.S. PATENT DOCUMENTS

| | | | | |
|---|---|---|---|---|
| 2,697,936 A | * | 12/1954 | Farrow .................. | G01N 29/07 73/644 |
| 9,041,409 B1 | * | 5/2015 | Look ...................... | G01R 31/54 324/522 |
| 2015/0160042 A1 | | 6/2015 | Bogos et al. | |
| 2016/0041235 A1 | * | 2/2016 | Ausserlechner ....... | G01R 33/02 324/244 |

(Continued)

FOREIGN PATENT DOCUMENTS

| | | |
|---|---|---|
| DE | 19520299 A1 | 12/1996 |
| DE | 102018204901 A1 | 10/2019 |

(Continued)

OTHER PUBLICATIONS

Search Report from corresponding EP Application No. EP20160963.3, dated Sep. 1, 2020.

*Primary Examiner* — Jermele M Hollington
*Assistant Examiner* — Temilade S Rhodes-Vivour
(74) *Attorney, Agent, or Firm* — Workman Nydegger

(57) ABSTRACT

A hybrid position sensor for determining the position of a hybrid target includes a main transducer for obtaining a first signal indicative for a position of the hybrid target within a first range and with a first resolution using a first or second technology; a support transducer for obtaining a second signal indicative for the position of the hybrid target within a second range and with a second resolution using the second technology if the main transducer is using the first technology and vice versa, wherein the first range is smaller than the second and the first resolution is higher than the second, and wherein the first technology is magnet based and the second technology is an inductive technology; a combiner for combining the obtained first signal and second signal to determine the position of the hybrid target.

15 Claims, 9 Drawing Sheets

(56) References Cited

U.S. PATENT DOCUMENTS

| | | | | |
|---|---|---|---|---|
| 2016/0139199 A1* | 5/2016 | Petrie | ............... | G01D 5/145 |
| | | | | 324/750.3 |
| 2016/0356628 A1* | 12/2016 | Foletto | ............. | G01R 33/091 |
| 2018/0158749 A1* | 6/2018 | Yu | ............. | H01L 23/3675 |
| 2021/0102853 A1* | 4/2021 | Hammerschmidt | .... | G01L 3/105 |

FOREIGN PATENT DOCUMENTS

| | | |
|---|---|---|
| EP | 2180296 A1 | 4/2010 |
| GB | 2542843 A | 4/2017 |

\* cited by examiner

HYBRID POSITION SENSOR

FIELD OF THE INVENTION

The invention relates to the field of position sensors. More specifically it relates to magnetic based position sensors and to inductive based position sensors.

BACKGROUND OF THE INVENTION

Extending the range of a position sensor is often at the expense of a reduced signal to noise ratio. This reduced signal to noise ratio may for example be caused by a reduced immunity of the position sensor to stray-fields.

For example in the field of rotation sensors, sensors which have a 360° range are sub-optimal. Both magnetic based position sensors, as well as inductive based position sensors suffer from a degraded accuracy when extending the range of the sensor.

Compared to inductive sensors limited to a 120° range, the electrical errors of an inductive sensor operating at a 360° range will be amplified with a factor 3. In addition, the mechanical errors are also magnified, especially the tilt. Parasitic sensitivity can for example reach 2° per degree of tilt. Typical 360° capable inductive sensors, which are usually based on half-moon targets suffer from large errors linked to rotational axis tilt.

Also, for differential stray-field immune magnetic position sensors the signal amplitude is degrading and the parasitic sensitivity to off-axis is increasing with an increasing angular range of the sensor.

Position sensors may for example be applied in devices for steering angle and BLDC motor control. The simplest configuration is a six-phase motor with magnetized one-pole-pair rotor. The six-coils in the stator are driven by three-phase signals and their inverse. In that configuration position sensing of the rotor over the full 360° range is needed.

Compared to existing 360° position sensors the low-range alternatives covering only 120° or 180° offer a significantly improved accuracy. This is especially the case for existing stray-field immune solutions. Such position sensors are designed for rejecting low-frequency stray fields.

In view of different application requirements, there is, therefore, a need for extending the range of position sensors. Preferably this should be achieved without significantly decreasing the signal to noise ratio.

SUMMARY OF THE INVENTION

It is an object of embodiments of the present invention to provide good position sensors and position devices.

The above objective is accomplished by a method and device according to the present invention.

In a first aspect embodiments of the present invention relate to a hybrid position sensor for determining the position of a hybrid target. The hybrid target comprises a conductive target and a magnet. In embodiments of the present invention the hybrid target can move in a movement space.

The position sensor comprises:
a main transducer configured for obtaining a first signal indicative for a position of the hybrid target within a first range and with a first resolution using a first technology or using a second technology,
a support transducer configured for obtaining a second signal indicative for the position of the hybrid target within a second range and with a second resolution using the second technology if the main transducer is using the first technology and vice versa.

Thereby, the first range is smaller than the second range and the first resolution is higher than the second resolution.

Moreover, the first technology is magnet based and is detecting the magnet and the second technology is an inductive technology and is detecting the conductive target.

The position sensor, moreover, comprises a combiner configured for combining the obtained first signal and second signal to determine the position of the hybrid target.

A hybrid position sensor according to embodiments of the present invention may be implemented in a single hybrid IC.

As the support transducer is configured for obtaining a second signal which is indicative for the position of the hybrid target with a second resolution, and as this second resolution is smaller than the first resolution, the support chain can be minimalistic, hence, cost optimized.

The combiner is configured for combining the first and second signal to obtain the position of the hybrid target. Thereby the position resolution of the main transducer can be achieved but with a higher range than the range of the main transducer.

In embodiments of the present invention the movement space may be divided in a plurality of sectors. The first signal may be used for determining the position within a sector and the second signal, or a combination of the first and second signal may be used for determining the sector in which the hybrid target is positioned.

In embodiments of the present invention the resolution (i.e. the smallest change that can be measured) of the support transducer is the sector size. The main transducer is configured for determining the position within a sector and hence has a higher resolution. The resolution of the main transducer divided by the resolution of the support transducer may for example be M/N with M/N<1.

In embodiments of the present invention the hybrid position sensor is configured for determining an angular position of the hybrid target. In embodiments of the present invention the main transducer is configured for computing a first angle, indicative for an angular position of the hybrid target within a sector, from the first signal and for computing a second angle, indicative for the sector of the movement space in which the hybrid target is positioned, from the second signal or from a combination of the first and second signal.

In embodiments of the present invention the combiner is configured for determining the position of the hybrid target from the first and the second angle.

In embodiments of the present invention the hybrid position sensor is configured for determining a linear position of the hybrid target.

In embodiments of the present invention the main transducer is configured for computing a first distance, indicative for an linear position of the hybrid target within a sector, from the first signal and for computing a second distance, indicative for the sector of the movement space in which the hybrid target is positioned, from the second signal or from a combination of the first and second signal.

In embodiments of the present invention the combiner is configured for determining the position of the hybrid target from the first and the second distance.

In embodiments of the present invention the transducer which is using the first technology comprises a Hall sensor or a magnetoresistive sensor.

In embodiments of the present invention the transducer which is using the second technology comprises at least one transmit coil to generate a magnetic field and at least one receive coil to receive a magnetic field and is configured for generating the magnetic field using the transmit coil and for receiving a signal from the receive coil.

The target will thereby emanate or affect the magnetic field.

In embodiments of the present invention the main transducer and the support transducer are packaged in the same package.

For example the coils or inductive technology may be integrated in the same package as the Hall sensor.

In embodiments of the present invention the main transducer comprises a readout chain for processing the first signal and the support transducer comprises a readout chain for processing the second signal and at least some signal conditioning elements of both chains are shared.

The signal processing chain for processing the first signal may for example comprise a signal conditioning element for filtering the first signal, and/or a signal conditioning element for obtaining an first angle or first distance from the first signal.

The signal processing chain for processing the second signal may for example comprise a signal conditioning element for filtering the second signal, and/or a signal conditioning element for obtaining a second angle or second distance from the second signal.

In embodiments of the present invention the readout chain of the main transducer may be the same as the readout chain of the support transducer.

In embodiments of the present invention the main transducer comprises a signal processing chain for processing the first signal and the support transducer comprises a signal processing chain for processing the second signal and both chains are at least partly or even completely separate.

It is thereby an advantage that measurements can be done simultaneously and that the signal conditioning chain of the support transducer can be minimalistic and therefore cheap.

In a second aspect embodiments of the present invention relate to a position device. The position device comprises a hybrid target which comprises a conductive target and a magnet. The position device, moreover, comprises a hybrid position sensor according to embodiments of the present invention. This hybrid position sensor is configured for determining the position of the hybrid target.

In embodiments of the present invention the main transducer is using the first technology and the support transducer is using the second technology.

In embodiments of the present invention the first range is 180°.

In embodiments of the present invention the magnet is a 4-pole magnet.

In embodiments of the present invention the main transducer or the support transducer is a differential sensor which comprises a plurality of Hall sensors or magnetoresistive sensors.

It is an advantage of embodiments of the present invention that the contribution of stray fields to the position obtained by the transducer is reduced by using a differential sensor.

In embodiments of the present invention the Hall sensors may be configured in a star configuration. An integrated magnetic concentrator may be directing the magnetic field of the magnet to the Hall sensors.

In embodiments of the present invention the main readout chain is using the second technology and the second readout chain is using the first technology.

In embodiments of the present invention the conductive target is made of a conductive ferromagnetic material and the magnet is obtained by magnetizing the ferromagnetic material.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
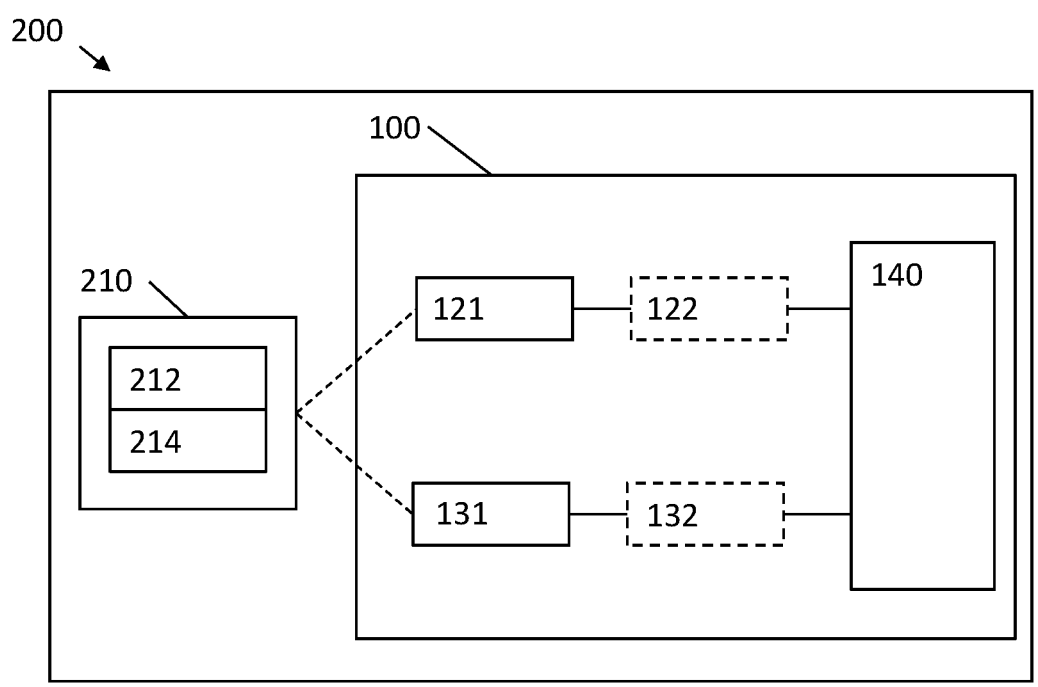
FIG. 1 shows a schematic drawing of a hybrid position sensor and of a position device in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a hybrid position sensor 100 and to a position device 200 comprising such a hybrid position sensor. A schematic drawing of a hybrid position sensor 100 in accordance with embodiments of the present invention and of a position device 200 in accordance with embodiments of the present invention is given in FIG. 1.

The hybrid position sensor 100 is configured for determining the position of a hybrid target 210. A hybrid target, according to embodiments of the present invention, comprises a conductive target 212 and a magnet 214 which can move in a movement space.

The hybrid sensor comprises a main transducer 121 configured for obtaining a first signal indicative for a position of the hybrid target 110 within a first range and with a first resolution. This signal is determined using a first technology or using a second technology.

The hybrid sensor, moreover, comprises a support transducer 131 configured for obtaining a second signal indicative for the position of the hybrid target 110 within a second range and with a second resolution. This signal is determined using the second technology if the main transducer is using the first technology and using the first technology if the main transducer is using the second technology.

The first technology is magnet based and is detecting the magnet 214 and the second technology is an inductive technology and is detecting the conductive target 212. The transducer which is using the first technology may comprise a Hall sensor or a magnetoresistive sensor.

The hybrid sensor, moreover, comprises a combiner 140 configured for combining the first signal and the second signal to determine the position of the hybrid target. In a second aspect embodiments of the present invention relate to a position device 200. The position device 200 comprises a hybrid target 210 and a hybrid position sensor 100 in accordance with embodiments of the present invention. The hybrid target 210 comprises a conductive target 212 and a magnet 214 and the hybrid position sensor 100 is configured for determining the position of the hybrid target.

In embodiments of the present invention the main transducer has a better accuracy than the support transducer and has a reduced range compared to the range of the support transducer. The support transducer is implemented in another technology as the main transducer so as not to interfere with the main transducer.

The support transducer provides the range extension. Therefore, the movement space may be subdivided in a number of sectors and the support transducer may allow to identify the sector in which the hybrid target is positioned. The main transducer, on the other hand, may be configured for obtaining a signal indicative for a relative position of the hybrid target within a sector.

The range which can be covered by the main transducer is smaller than the range which can be covered by the support transducer, but the resolution of the main transducer is higher than the resolution of the support transducer.

Hybrid position sensors 100 according to embodiments of the present invention may for example be configured for determining the angular position of the hybrid target. Sectors may for example be sectors of 180° or 120°. The needed accuracy for the support transducer is significantly relaxed as it only has to identify the sector in which the hybrid target is positioned. Depending on the configuration errors of 120° or 60° are acceptable without compromising the range extension. By leveraging this relaxed specification, the incremental cost due to the support readout chain can be kept minimal.

In embodiments of the present invention the main transducer may be using the first technology (the magnet based technology) and the support transducer may be using the second technology (the inductive technology). In these embodiments the more accurate measurements are obtained by the magnet based technology.

The main transducer provides the more accurate measurements over a limited range (e.g. 180° or less). The support transducer allows to obtain a hybrid position sensor with an extended range (e.g. up to 360°).

Figure 2:
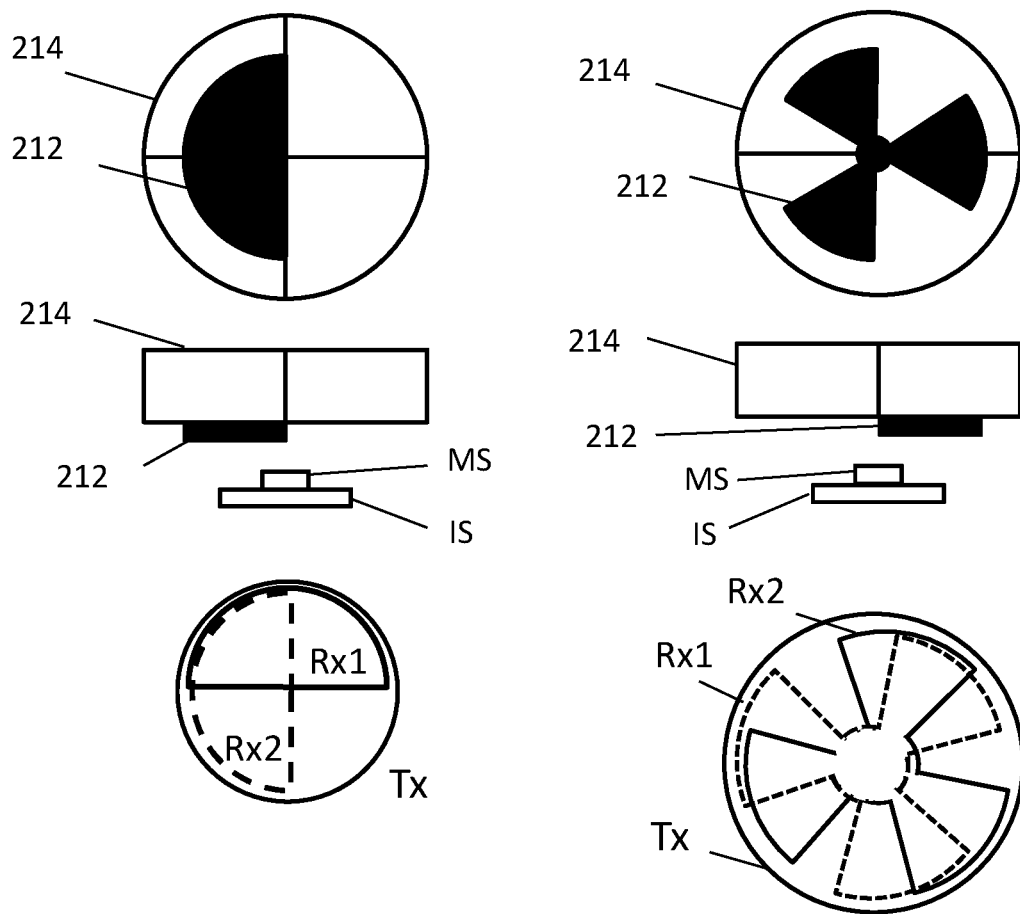
FIG. 2 shows schematic drawings of a accurate Hall hybrid position device, and of a accurate inductive hybrid position device in accordance with embodiments of the present invention.

An example thereof is illustrated in the left column of FIG. 2. The top two drawings respectively show a schematic drawing of a top view, and of a lateral cross-section of a hybrid target. In the example the magnet 214 is a 4 pole magnet and the conductive target 212 is a half-moon target. The bottom drawing shows a schematic drawing of a top view of a coil configuration for inductively measuring the position of the conductive target.

In this example the main transducer 121 comprises a magnetic sensor MS (e.g. a Hall sensor) and the support transducer comprises a transmit and receive coil and an inductive sensor (IS).

The main transducer comprises at least one Hall sensor for obtaining a signal indicative for a relative position of the hybrid target. A plurality of Hall sensors may be present such that a differential measurement can be done. This differential measurement allows to reduce the contribution of stray fields which are disturbing the position measurement. In one embodiment, the main transducer may comprise 4 or 8 Hall sensors configured to measure two magnetic field gradients generated by a 4-pole magnet. An integrated magnetic concentrator may be present for concentrating the magnetic flux lines and bending them towards the one or more Hall plates to increase the sensitivity (in this drawing the integrated magnetic concentrator is not drawn to scale, on scale it may for example be 10 times smaller).

The support transducer comprises at least one transmit coil to generate a magnetic field and at least one receive coil to receive a magnetic field and is configured for generating the magnetic field using the transmit coil and for receiving a signal from the receive coil. In the exemplary embodiment in FIG. 2, the support transducer comprises one transmit coil (Tx) and 2 receive coils (R1l, Rx2). Different other configurations may be implemented as long as there is at least one transmit coil and at least one receive coil (e.g. 2 or 3 or 4 receive coils). In this example the receive coils are two coils in quadrature (90 deg phase shift electrical between the signals). Also, for example 3 coils can be used (with a 120 deg phase shift). Generating and measuring the currents through the Tx- and Rx-coils respectively may be done by the inductive sensor IS.

In embodiments of the present invention a coil may have an inverted and a non-inverted coil segment (the inverted coil segment is not shown in FIG. 2). By adding the complementary inverted coil segment (in which the current flows in the opposite direction), a common mode signal which is present on the inverted and non-inverted coil segment can be cancelled. Thus, the transducer can be configured to generate a signal from which the common mode component is removed (such that only the target induced signal is visible in the generated signal).

In this example the main transducer has a position accuracy of less than 1° (e.g. about 0.65°). This accuracy can be provided over a range of 180° corresponding with one sector. The support transducer has a position accuracy of less than 90° over a range of 360°. Thus two sectors can be identified over the range of 360°. The accuracy of the support transducer is sufficient to identify the sector in which the hybrid target is positioned. Thus, a hybrid sensor is obtained which has a position accuracy of less than 1° over the full range of 360°.

In embodiments of the present invention the main transducer may be using the second technology (the inductive technology) and the support transducer may be using the first technology (the magnet based technology). In these embodiments the more accurate measurements are obtained by the inductive technology.

It is an advantage of embodiments of the present invention that the inductive technology is immune to stray fields. The reason therefore is that the RX coils only detect the AC field transmitted by the TX-coil. Therefore the position obtained by combining the first signal and the second signal is also immune to stray fields and additionally range extension is provided by combining the first and second signal.

The main transducer provides the more accurate measurements over a limited range (e.g. 180° or less, e.g. 120°). The support transducer allows to obtain a hybrid position sensor with an extended range (e.g. up to 360°).

An example thereof is illustrated in the right column of FIG. 2. In this example the magnet 214 is a 2 pole magnet and the conductive target 212 is a three-lobe target.

In this case the main transducer comprises at least one transmit coil (in the exemplary embodiment it is one transmit coil Tx) to generate a magnetic field and at least one receive coil (in this exemplary embodiment two receive coils Rxl and Rx2) to receive a magnetic field and comprises an inductive sensor IS which is configured for generating the magnetic field using the transmit coil and for receiving a signal from the receive coil.

The support transducer comprises at least one magnetic sensor MS (e.g. a Hall sensor) for obtaining a signal indicative for the sector in which the hybrid target is positioned. Also in this example a plurality of Hall sensors may be present such that a differential measurement can be done. This differential measurement allows to reduce the contribution of stray fields which are disturbing the position measurement. For the differential measurement the support transducer may comprise four Hall elements.

An integrated magnetic concentrator (IMC) may be present for concentrating the magnetic flux lines and bending them towards the one or more Hall plates to increase the sensitivity (in this drawing no integrated magnetic concentrator is present). The IMC may for example bend magnetic field lines such as to measure a magnetic field using a horizontal Hall element wherein the magnetic field is parallel with the substrate. The horizontal Hall element on itself is not sensitive to magnetic field parallel with the substrate. By bending the magnetic field lines it becomes possible to measure the magnetic field parallel with the substrate. In case the sensor is configured for measuring differential fields in the Z direction (out-of-plane) no IMC is needed.

In this example the main transducer has a position accuracy of less than 1° or even less than 0.1°. This accuracy can be provided over a range of 120° corresponding with one sector. The support transducer has a position accuracy of less than 60° over a range of 360°. Thus three sectors can be identified over the range of 360°. The accuracy of the support transducer is sufficient to identify the sector in which the hybrid target is positioned. Thus, a hybrid sensor is obtained which has a position accuracy of less than 1° (or even less than 0.1°) over the full range of 360°.

In embodiments of the present invention the hybrid target 210 comprises a conductive target 212 and a magnet 214. In some embodiments of the present invention these may be separate components which are connected together. In some embodiments the conductive target 212 and the magnet 214 may be integrated in one component.

When the conductive target 212 and the magnet 214 are separate components they may be stacked such that they are at least partially overlapping. They may be planar components. They may be circular planar components. In the latter case they may have the same central axis. As can be seen from the example in FIG. 2 and FIG. 3 the radius of the conductive target may be smaller than or equal to the radius of the radius of the magnet. In embodiments of the present invention the radius of the magnet may be substantially equal (e.g. less than 10%, or even less than 5% difference) to the radius of the conductive target. The conductive target 212 may be non-magnetic and the magnet 214 may be electrically isolating.

When the conductive target 212 and the magnet 214 are separate components the magnet may be made of insulating material (e.g. an insulating Ferrite) to avoid interference between the conductive target and the magnet. The conductive target can be a thin (<100 μm) patterned metallic film (e.g. Aluminum). The conductive target may be stacked on the magnet.

Figure 3:
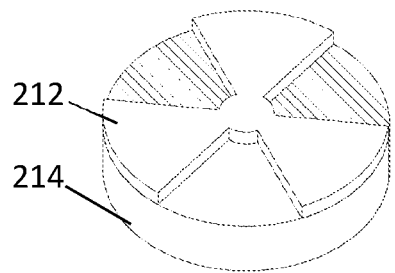
FIG. 3 shows schematic drawings of hybrid targets in accordance with embodiments of the present invention.
Figure 3:
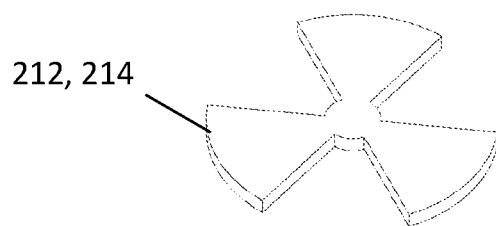
Figure 3:
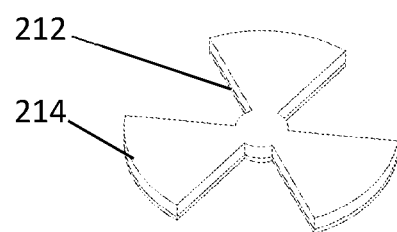

An example thereof is illustrated in FIG. 2 and the top drawing of FIG. 3 where the magnet 214 and the conductive target 212 are stacked on top of each other and have the same rotation axis. Thus the overall diameter of the hybrid target can be kept limited. As the diameter of the target can be kept limited also the diameter of the coils which are generating and receiving the magnetic field can be kept limited, and hence also the size of the hybrid position sensor can be kept limited. The size of the coils may for example be scaled down to less than 5 mm. The stacked configuration of FIG. 3 comprises a three-lobe conductive target 212, offering a range of 120°. Using such a target an accuracy of more than 1° or even more than 0.1° can be achieved. The conductive target is stacked on a two-pole magnet 214. This two-pole magnet can be used for the range extension.

In embodiments of the present invention the conductive target 212 and the magnet 214 may be formed of one component. This may be achieved by machining the conductive target of ferromagnetic material and by magnetizing the ferromagnetic material in plane. The ferromagnetic material may for example be Neodymium. In a particular embodiment the ferromagnetic material may for example be machined into three sectors and magnetized in plane. An example thereof is illustrated by the middle drawing of FIG. 3. In the example the single element serves simultaneously as a metallic conductive target for the inductive technology, and as a 2-pole magnet for the magnet based technology. The 2-pole magnet is obtained by magnetizing the machined ferromagnetic material along one of the lobes. By doing so the target behaves as a 2-pole magnet. Thus, a more simplified and possibly cheaper target is obtained thanks to the combination of two functions (conductive target and magnet) into one component.

The bottom drawing of FIG. 3 represents yet another embodiment. In this example the magnet 214 has the same shape as the conductive target 212. This conductive target 212 is a coating of conductive material on the magnet 214. Thus, a similar embodiment as in the middle drawing is obtained, but with the advantage that the magnet 214 can be made of non-conductive magnetic material (such as NdFeB or ferrite). The coating can for example be made of nickel (Ni). Any suitable coating material known by the skilled person can be used. It can be present on one side of the target (as shown in the figure), on both sides of the target, or all around the target.

In embodiments of the present invention a readout chain 122 may be present for the main transducer and a separate readout chain 132 may be present for the support transducer. The readout chain may be configured for converting an analog signal which is representative for the position into a digital signal which is representative for the position. In some embodiments the readout chains may have shared signal conditioning elements. For example the ADC may be shared between both readout chains. In some embodiments the hybrid position sensor comprises a readout chain which is shared between the main transducer and the support transducer. It is an advantage of embodiments of the present invention that the cost increase in terms of silicon area for introducing the support transducer can be kept to a minimum. This is especially the case for embodiments where at least part of the readout chain can be reused between the main transducer and the support transducer. The cost increase can for example be kept below 10%.

A special advantage of some embodiments of the present invention is that the accuracy of the support transducer should only be sufficient to determine the sector in which the hybrid target is positioned. The signal to noise ratio of the support transducer may therefore be significantly smaller than the signal to noise ratio of the main transducer (e.g. more that 3 dB, or even more than 6 dB, or even more than 10 dB smaller).

Figure 4:
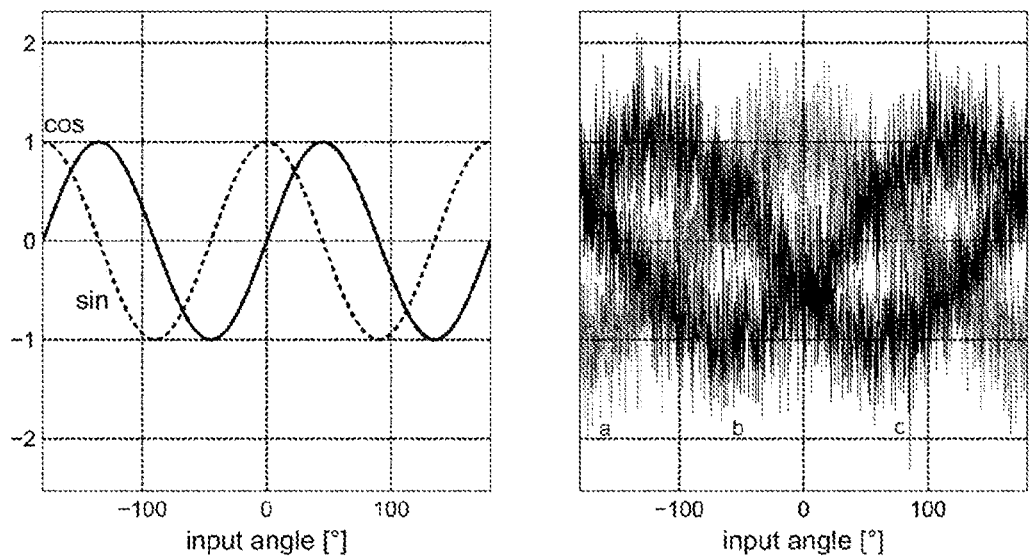
FIG. 4 shows signals indicative for the position with a first range and with a first resolution and shows signals indicative for the position with a second range and with a second resolution respectively obtained using a main transducer and using a support transducer in accordance with embodiments of the present invention.
Figure 5:
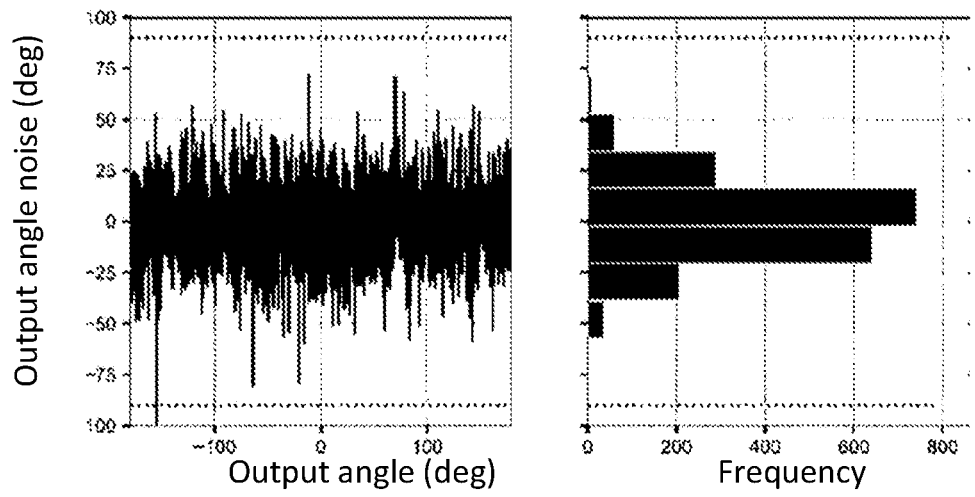
FIG. 5 illustrated the angle noise in the second chain, this is the noise on the output angle which is obtained from the one or more signals from the support transducer, in accordance with embodiments of the present invention.
Figure 6:
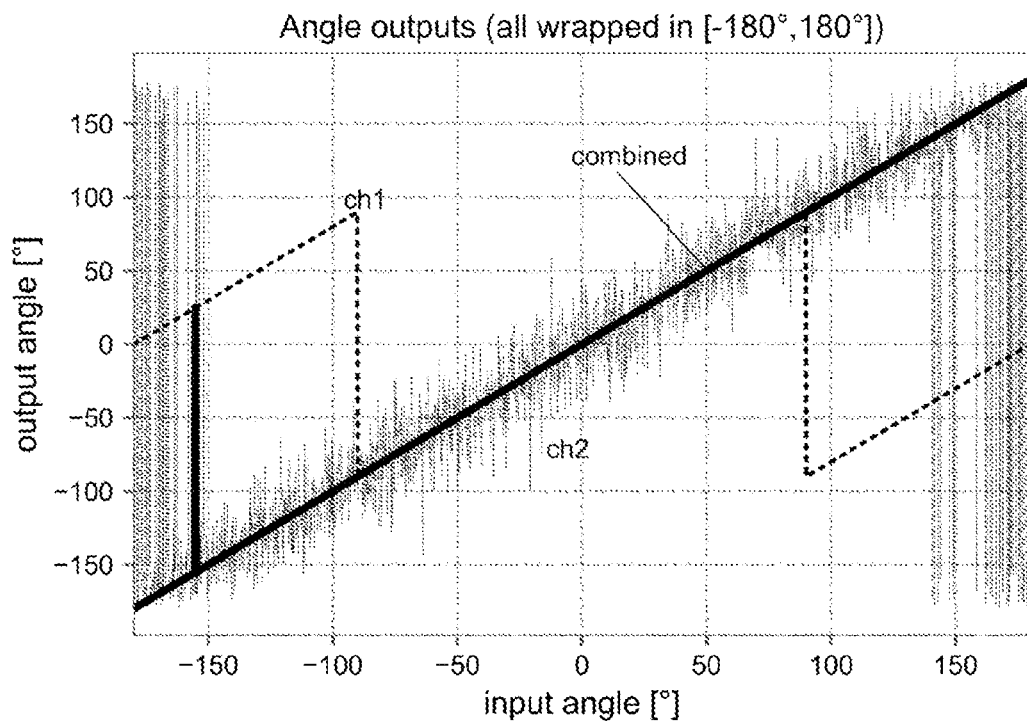
FIG. 6 shows the angles obtained using the main transducer, using the support transducer, and the eventual position (also expressed as an angle) obtained by combining the first signal and the second signal, in accordance with embodiments of the present invention.

This is illustrated in FIGS. 4 to 6 for the accurate Hall concept (i.e. the main transducer is using Hall sensors, and the support transducer is using inductive technology).

The left graph of FIG. 4 shows an output of a main transducer of a hybrid position sensor, in accordance with embodiments of the present invention. The main transducer is Hall sensor based. As can be seen from the figure the main readout chain provides accurate quadrature Hall cosine and sine signals with 180° range. In this example the 180° range comes from the fact that a 4-pole magnet (rotation symmetric over 180°) in combination with differential Hall sensor measurements are used. The accurate angle $\theta_1$ from this main readout chain allows to determine the angle position within a half-circle sector.

The support inductive readout chain provides the angle $\theta_2$. The support inductive readout chain is used to determine the sector only. In this example errors up to +/−90° can be tolerated in $\theta_2$ without impacting the sector decision. In general, this tolerance is dependent on the sector size. The sector size is the size within which a signal indicative for a relative position can be determined by the main transducer.

The right graph of FIG. 4 shows the raw three-phase inductive signals of the support readout chain. Each of these signals have a normal distribution with a significant noise level. For each sinewave, the amplitude signal-to-noise ratio is about 2. As can be seen from this figure a transducer with such a noise level would not be usable in prior art position sensors. In embodiments of the present invention, however, such a transducer can be used as a support transducer for obtaining one or more signals which are indicative for the sector of the movement space in which the hybrid target is positioned.

The noise in the output angle $\theta_2$ of the support readout chain is shown in FIG. 5. This angle is obtained from the one or more signals from the support transducer. The left graph shows the output angle noise in function of the output angle. The right graph shows the frequency of different ranges of measured angles. In this example the standard deviation is just below 20°.

FIG. 6 shows the angles obtained using the main transducer, using the support transducer, and the eventual position (also expressed as an angle) obtained by combining the first signal (indicative for a position within a sector) and the second signal (indicative for the sector). The first signal may for example be expressed as an angle. It may be computed from the transducers quadrature signal, for example by calculating a ratio between two transducer signals (e.g. cos/sin), and computing an arctan of the ratio (e.g. $\alpha$=atan (cos/sin)). Note that in this example all angles are by convention wrapped into the [−180°, +180°] range. The output of the first readout chain (the first signal ch1 indicative for a position of the hybrid target within a first range and with a first resolution) is accurate, but provides only a reduced range of +/−90°. The output of the second readout chain (the second signal ch2 indicative for the position of the hybrid target within a second range and with a second resolution) is noisy but covers the full turn. A combined angle $\theta_0$ can be readily constructed by selecting either $\theta_1$ or $\theta_1$+180°. In embodiments of the present invention the most plausible option is selected based on the value of $\theta_2$. The most plausible option may for example be the one yielding the smallest angle error between $\theta_0$ and $\theta_2$. This gives a combined output angle with the accuracy of $\theta_1$ and the range of $\theta_2$ (full 360°).

In embodiments of the present invention the noise on the signal which is indicative for the sector in which the target is positioned may be so small that the sector can be unambiguously identified. The maximum noise level is, hence, limited by the sector size. This sector size is defined by the main transducer. It is the size of the sector within which the main transducer can do an accurate measurement.

In some embodiments of the present invention the noise in the second readout chain may be limited to remain below 10°, rms (root mean square). This amounts to about 2 orders of magnitude of specification relaxation compared to usual targets. It is a particular advantage of embodiments of the present invention that the accuracy of the support readout chain should only allow to identify the sector in which the hybrid target is positioned.

In an exemplary embodiment of the present invention the main transducer is an accurate inductive transducer with 120° range. In this embodiment the critical thresholds are located at +/−60°, which is still more than 1 order of magnitude larger than usual errors in Hall based sensors.

In embodiments of the present invention an algorithm may be implemented on the combiner for combining the obtained signals which are indicative for the sector and the relative position within the sector. The combination algorithm outlined in the previous section may for example be used at start-up of the hybrid position sensor when there is no information available about the past angles.

For sensors based on a high-speed tracking loop, the current angle and angular speed can also be used for the plausibility check. Assuming that the mechanical angle cannot abruptly jump by one 180° sector, the sector can be readily determined from $\theta_1$ alone and its history. In that context $\theta_2$ is not needed apart at start-up to initialize the sector. This is a key advantage as this indicates that $\theta_2$ only needs to calculated very infrequently. Again the cost of the support readout chain, in terms of the burden of the system design, can be optimized.

Figure 7:
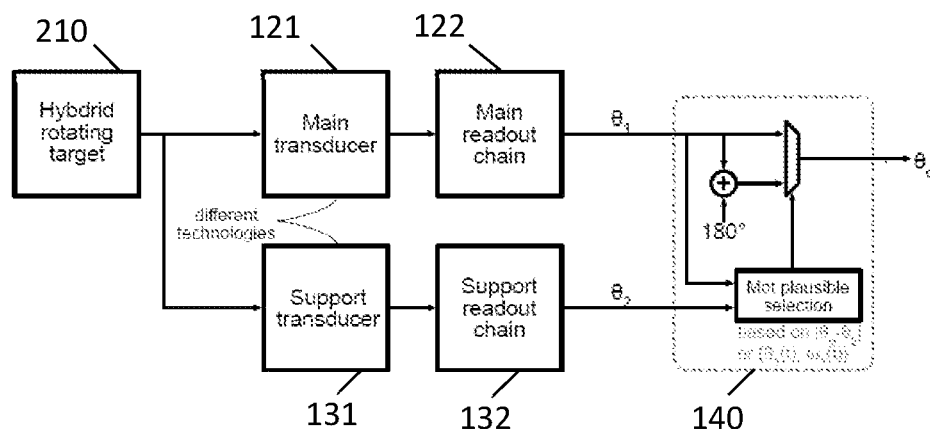
FIG. 7 shows a schematic drawing of an exemplary embodiment of a hybrid position sensor 100 and of a position device 200 in accordance with embodiments of the present invention.

FIG. 7 shows a schematic drawing of an exemplary embodiment of a hybrid position sensor 100 and of a position device 200 in accordance with embodiments of the present invention.

The position device 200 comprises a hybrid rotating target 210 and a hybrid position sensor 100. The position sensor 100 comprises a main transducer 121, a support transducer 131 and a combiner 140. The main transducer is configured for obtaining a signal indicative for a relative position of the hybrid target within a sector of the movement space. The support transducer is configured for obtaining a signal which is indicative for the sector of the movement space in which the hybrid target is positioned. The combiner is configured for combining the obtained signals to determine the position of the hybrid target. The combiner may therefore comprise a readout chain 122 for the main transducer and a readout chain 132 for the support transducer. In the example the readout chain for the main transducer is different from the readout chain for the support transducer. This is, however, not strictly necessary. The readout chain (e.g. the AD converter) may be shared between the main transducer and the readout transducer.

In this example the main readout chain converts the one or more signals of the main transducer into an angle $\theta_1$ (relative to a sector with an error which may for example be smaller than 1°), and the support readout chain converts the one or more signals of the support transducer into an angle $\theta_2$ (for determining the sector in which the hybrid signal is positioned). The obtained angles are combined to obtain an angle which defines the absolute position of the hybrid target over the complete movement space. In the example $\theta_1$ is an angle relative to a sector of 180° (or for example 120°) and $\theta_2$ has an error less than 90° (or for example less than 60°) which allows to determine the sector. In the case of a sector of 180°, depending on the sector, 180° is added to $\theta_1$ or not. In this example a multiplexer is used to make this selection. At start-up $\theta_2$ is used to determine the selection. In case of a continuous movement this is not strictly necessary. After start-up the most plausible sector may be determined from the past primary angle and its angular speed $\omega_1$.

In embodiments of the present invention the conductive target 212 may be a half moon target.

In embodiments of the present invention the hybrid position sensor may be packaged in a chip.

In some embodiments of the present invention the size of the coils may be kept limited (e.g. less than 1 cm). Especially in case they are used for the support transducer the size of the inductive coils may be limited as the signal to noise ratio may be less than for the main transducer.

In these embodiments the coils may be integrated in the same chip package. Examples thereof are shown in the schematic drawings of FIG. 8 and FIG. 9.

In other embodiments the coils may have a larger size (for example in the accurate inductive implementation the coils may have a dimension of several centimeters). In that case the coils may be implemented on a PCB.

Figure 8:
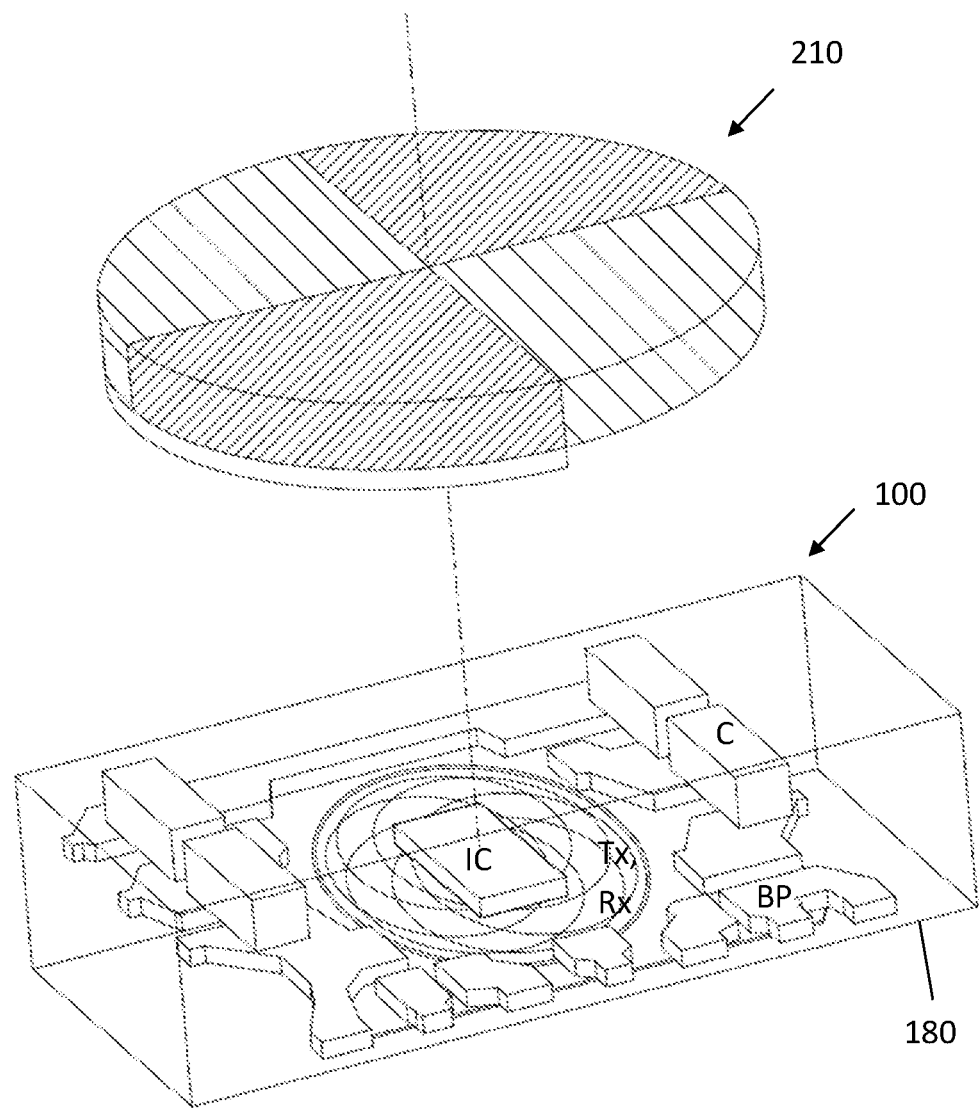
FIG. 8 shows a schematic drawing of a hybrid target and a angular position sensor in accordance with embodiments of the present invention wherein the main transducer and the support transducer are packaged in the same chip.

In the 3D-schematic drawing of FIG. 8 a hybrid target 210 and a position sensor 100 are shown. In this example the position sensor is an angular sensor. The dashed line is the rotation axis. The hybrid target 210 comprises a quadrupole magnet and the conductive target is a half moon target. In this example the main transducer and the support transducer are packaged in the same package 180. In the figure the coils are indicated by tx, rx. Functionality of the main transducer, the support transducer and the combiner may be implemented in the IC. Capacitors C and bondpads BP may be present in the same package.

Figure 9:
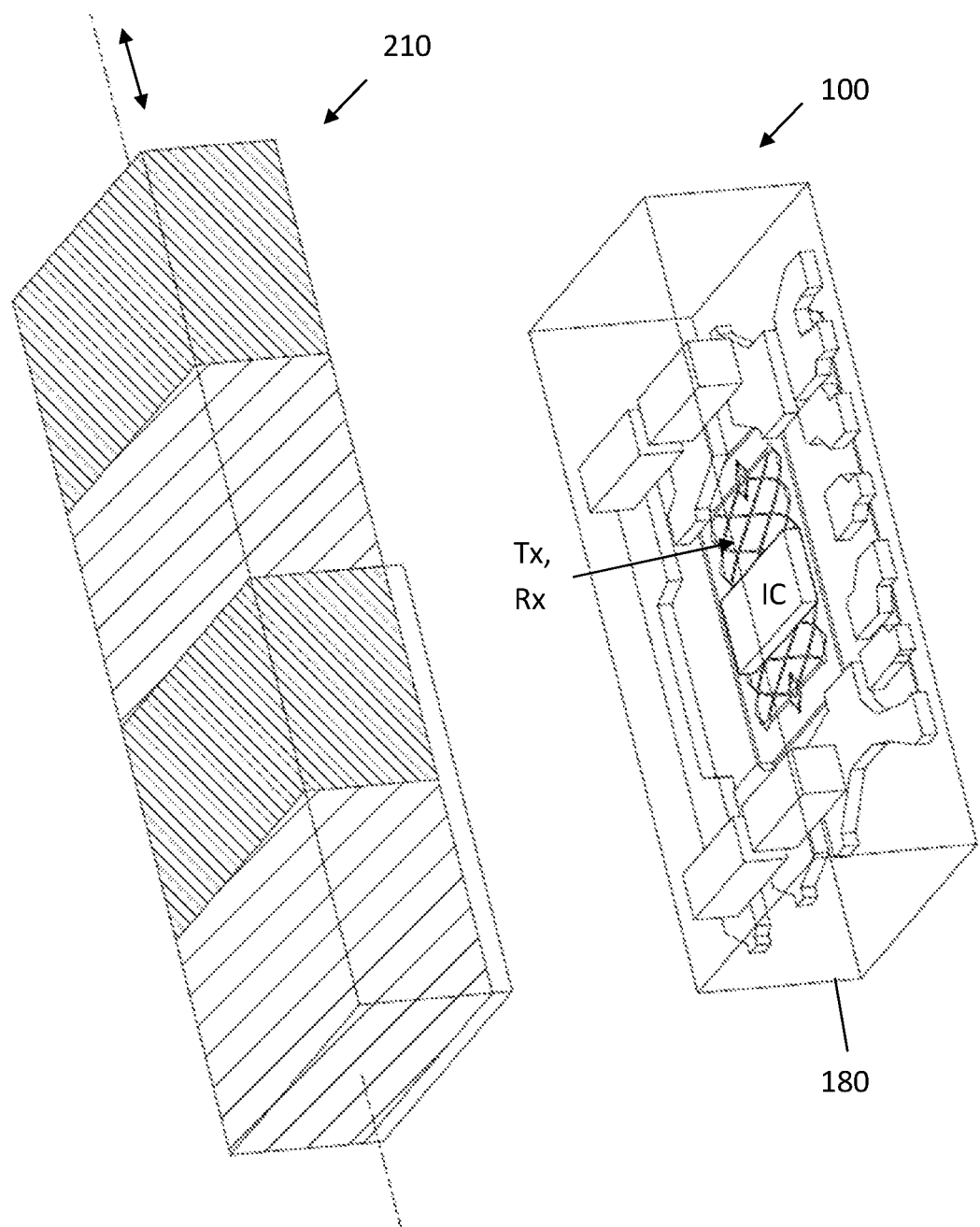
FIG. 9 shows a schematic drawing of a hybrid target and a linear position sensor in accordance with embodiments of the present invention wherein the main transducer and the support transducer are packaged in the same chip.

FIG. 9 shows a hybrid target 210 and a position sensor 100 for determining a linear position of the hybrid target. The dashed line shows the direction along which the hybrid target can be moved. Also, in this example the main transducer and the support transducer are packaged in the same package 180. The coil configuration is different from the coil configuration in FIG. 8 in view of the fact that a linear position is detected using this hybrid position sensor.

Figure 10:
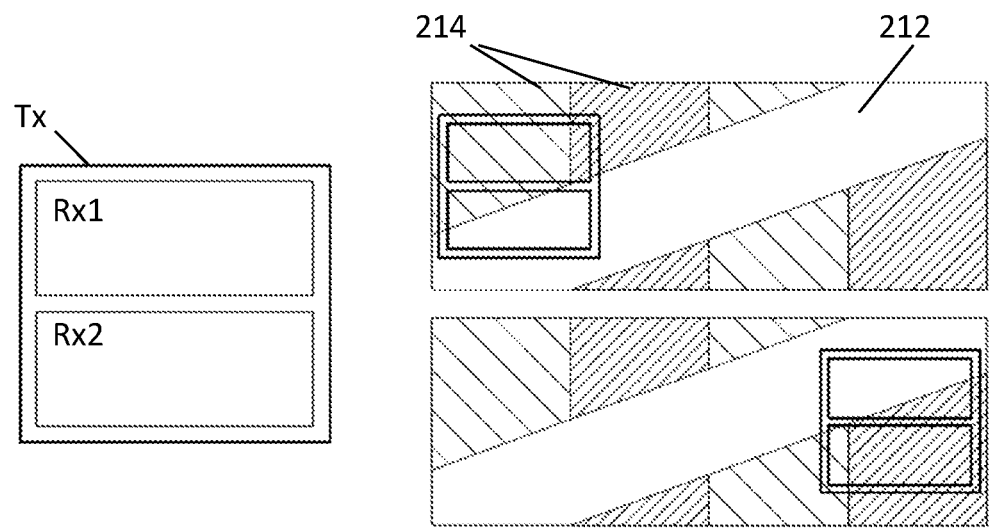
FIG. 10 and FIG. 11 show schematic drawings of a hybrid target and of a coil configuration for a linear position sensor in accordance with embodiments of the present invention.

The left drawing in FIG. 10 shows a schematic drawing of 2 RX-coils (Rx1, Rx2) circumvented by one TX-coil (Tx). The right drawing shows a hybrid target comprising two magnet pairs 214 (the diagonal shading in one direction indicating a North-pole and the diagonal shading in another direction indicating a South-pole). A conductive target is diagonally crossing the hybrid target. In the top right drawing the coils are positioned in the left segment. In that case the voltage induced in the second coil Rx2 will be larger than the voltage induced in the first coil Rx1. In the bottom right drawing the coils are positioned in the right segment. In that case the voltage induced in the second coil Rx2 will be smaller than the voltage induced in the first coil Rx1. A ratio between the current through the two coils can be calculated and used as signal indicative for the position of the hybrid target.

Figure 11:
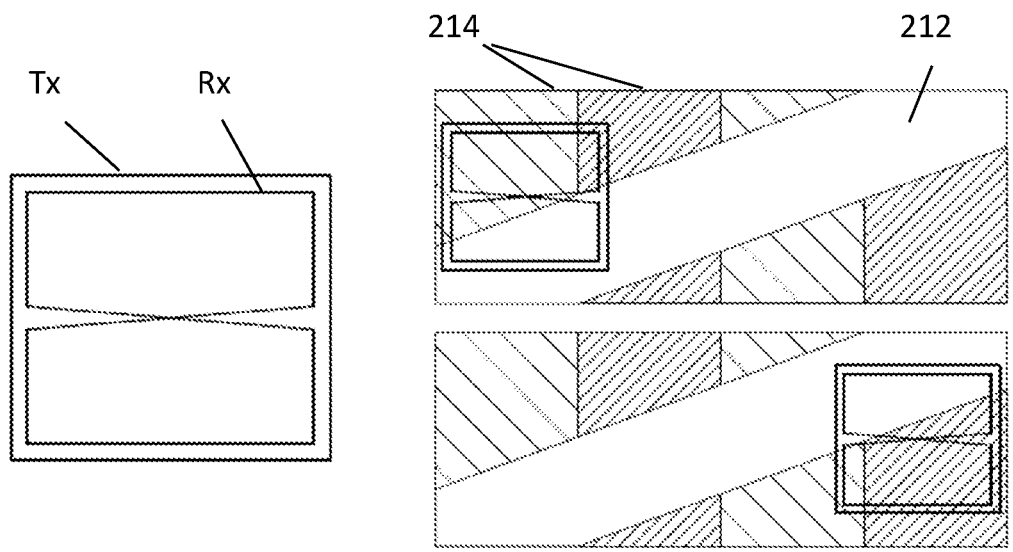

An alternative configuration of a Tx and Rx coil is shown in FIG. 11. In this example a circular Tx coil is circumventing an eight shaped Rx coil. A positive signal will be induced in the Rx coil when the coils are positioned in the left segment and a negative signal will be induced in the Rx coil when the coils are positioned in the right segment.

Figure 12:
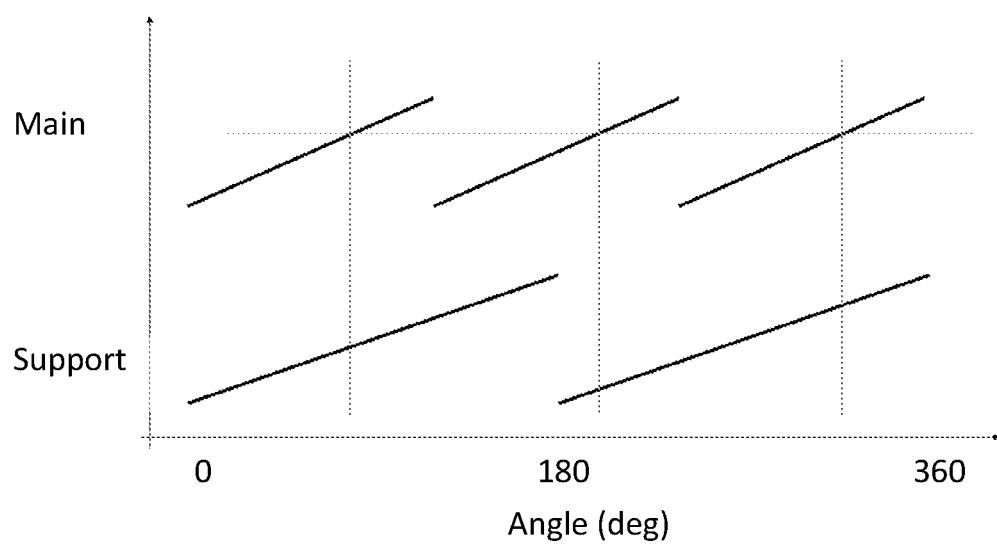
FIG. 12. shows a graph with the first signal of the main transducer and the second signal of the support transducer in function of the angular position of the hybrid target obtained using a position sensor in accordance with an exemplary embodiment of the present invention.

In embodiments of the present invention the main transducer is configured for obtaining a first signal indicative for a position of the hybrid target within a first range and with a first resolution. The support transducer is configured for obtaining a second signal indicative for the position of the hybrid target within a second range and with a second resolution. The first range is smaller than the second range and the first resolution is higher than the second resolution. By combining the first signal and the second signal the position of the hybrid target can be determined with the resolution of the first signal. It is thereby noted that the range obtained by the combination of the first and second signal may even be wider than the range of the second signal. This is further explained using FIG. 12. It shows the first signal (the signal of the main transducer) and the second signal (the signal of the support transducer) in function of the position of the hybrid target (in this case expressed as an angular position). By combining the first signal and the second signal, the position can be obtained with the resolution of the position of indicated by the first signal and with a range which is a combination of the first and second range and is larger than the first and second range. Even though the support transducer has a range of 180°, it is still possible to resolve the full 360° range. As same angle values from the main transducer have different values in the support transducer, no ambiguity is present in the combination of both signals, and the 360° range can still be resolved.

In summary, in embodiments of the present invention two readout transducers are present (main and support) which are implemented in different technologies. Thus, an efficient combination is obtained of Hall and inductive position sensing leveraging the best of both to obtain an increased operating reach (e.g. a 360° operating range) without compromising the accuracy. The main transducer is more accurate but has a limited range whereas the support transducer is less accurate but has a larger range.

The invention claimed is:

1. A hybrid position sensor for determining the position of a hybrid target which comprises a conductive target and a magnet, the position sensor comprising:
    a main transducer configured for obtaining a first signal indicative for a position of the hybrid target within a first range and with a first resolution using a first technology or using a second technology;
    a support transducer configured for obtaining a second signal indicative for the position of the hybrid target within a second range and with a second resolution using the second technology if the main transducer is using the first technology and vice versa;
    wherein the first range is smaller than the second range and wherein the first resolution is higher than the second resolution;
    wherein the first technology is magnet based and is detecting the magnet and wherein the second technology is an inductive technology and is detecting the conductive target;
    a combiner configured for combining the obtained first signal and second signal to determine the position of the hybrid target.

2. The hybrid position sensor according to claim 1, configured for determining an angular position of the hybrid target.

3. The hybrid position sensor according to claim 1, configured for determining a linear position of the hybrid target.

4. The hybrid position sensor according to claim 1, wherein the transducer which is using the first technology comprises a Hall sensor or a magnetoresistive sensor.

5. The hybrid sensor according to claim 1, wherein the transducer which is using the second technology comprises at least one transmit coil to generate a magnetic field and at least one receive coil to receive a magnetic field and is configured for generating the magnetic field using the transmit coil and for receiving a signal from the receive coil.

6. The hybrid sensor according to claim 1, wherein the main transducer and the support transducer are packaged in a same package.

7. The hybrid sensor according to claim 1, wherein the main transducer comprises a readout chain for processing the first signal and wherein the support transducer comprises a readout chain for processing the second signal and wherein at least some signal conditioning elements of both chains are shared.

8. The hybrid sensor according to claim 1, wherein the main transducer comprises a signal processing chain for processing the first signal and wherein the support transducer comprises a signal processing chain for processing the second signal and wherein both chains are at least partly or even completely separate.

9. A position device comprising a hybrid target which comprises a conductive target and a magnet, the position device, moreover, comprising a hybrid position sensor according to claim 1, which is configured for determining the position of the hybrid target.

10. The position device according to claim 9, wherein the main transducer is using the first technology and the support transducer is using the second technology.

11. The position device according to claim 10, configured for determining an angular position of the hybrid target, wherein the first range is 180°.

12. The position device according to claim 10, wherein the magnet is a 4-pole magnet.

13. The position device according to claim 12, wherein the main transducer or the support transducer is a differential sensor which comprises a plurality of Hall sensors or magnetoresistive sensors.

14. The position device according to claim 9, wherein a main readout chain is using the second technology and a second readout chain is using the first technology.

15. The position device according to claim 9, wherein the conductive target is made of a conductive ferromagnetic material and wherein the magnet is obtained by magnetizing the ferromagnetic material.

* * * * *